US012330911B2

(12) United States Patent
Bellissimo et al.

(10) Patent No.: US 12,330,911 B2
(45) Date of Patent: Jun. 17, 2025

(54) MODULAR ELEVATOR SYSTEMS AND METHODS

(71) Applicant: Buildz, LLC, Forest City, NC (US)

(72) Inventors: Mark Joseph Bellissimo, Wellington, FL (US); Robert Francis Kelsch, Hendersonville, NC (US); Stanley Clark Beard, Jr., Hendersonville, NC (US); Jason Daryl Hunsinger, Forest City, NC (US)

(73) Assignee: Buildz, LLC, Forest City, NC (US)

( * ) Notice: Subject to any disclaimer, the term of this patent is extended or adjusted under 35 U.S.C. 154(b) by 0 days.

(21) Appl. No.: 18/251,799

(22) PCT Filed: Nov. 10, 2021

(86) PCT No.: PCT/US2021/058724
§ 371 (c)(1),
(2) Date: May 4, 2023

(87) PCT Pub. No.: WO2022/103795
PCT Pub. Date: May 19, 2022

(65) Prior Publication Data

US 2024/0017965 A1 Jan. 18, 2024

Related U.S. Application Data

(60) Provisional application No. 63/111,989, filed on Nov. 10, 2020.

(51) Int. Cl.

| | |
|---|---|
| ***B66B 11/00*** | (2006.01) |
| ***B66B 9/04*** | (2006.01) |
| ***B66B 19/00*** | (2006.01) |

(52) U.S. Cl.
CPC ............ *B66B 11/0005* (2013.01); *B66B 9/04* (2013.01); *B66B 11/002* (2013.01);
(Continued)

(58) Field of Classification Search
CPC ............... B66B 11/002; B66B 11/0005; B66B 11/0045; B66B 19/00
See application file for complete search history.

(56) References Cited

U.S. PATENT DOCUMENTS

| | | | | |
|---|---|---|---|---|
| 4,231,148 A * | 11/1980 | Harding | E04F 17/005 | 29/469 |
| 5,012,621 A * | 5/1991 | Power | E04B 1/34869 | 52/745.03 |
| 11,780,706 B2 * | 10/2023 | Wang | B66B 19/00 | 187/250 |

FOREIGN PATENT DOCUMENTS

| | | |
|---|---|---|
| AU | 625660 B2 | 7/1992 |
| CN | 208531965 U | 2/2019 |

(Continued)

OTHER PUBLICATIONS

Machine Translation of AU 625660.*

(Continued)

*Primary Examiner* — Diem M Tran
(74) *Attorney, Agent, or Firm* — Michele V. Frank; Venable LLP

(57) ABSTRACT

A modular elevator system has a pit module, one or more shaft modules that are attachable to the pit module and/or to an adjacent shaft module, and a cap module that is attachable to an uppermost shaft module. The pit module, the shaft modules, and the cap module are each pre-fabricated and transported to a site at which a building is under construction for assembly top of the pit module, the remaining shaft modules are secured sequentially on top of each other, and the cap module is secured on top of the uppermost shaft module.

35 Claims, 4 Drawing Sheets

(52) U.S. Cl.
CPC .......... *B66B 11/0045* (2013.01); *B66B 19/00* (2013.01); *B66B 2201/30* (2013.01)

(56) References Cited

FOREIGN PATENT DOCUMENTS

| | | | | | |
|---|---|---|---|---|---|
| CN | 110 924 630 | A | | 3/2020 | |
| DE | 202014000273 | U1 | * | 5/2014 | B66B 11/00 |
| EP | 2559647 | A1 | * | 2/2013 | B66B 19/00 |
| EP | 3401267 | A1 | | 11/2018 | |
| EP | 3747820 | A1 | * | 12/2020 | B66B 11/0005 |
| WO | WO-2022242830 | A1 | * | 11/2022 | |
| WO | WO-2023198277 | A1 | * | 10/2023 | |
| WO | WO-2023227822 | A1 | * | 11/2023 | |

OTHER PUBLICATIONS

Machine Translation of EP 3747820.*
International Search Report and Written Opinion from PCT/US2021/058724 dated Feb. 7, 2022.
Communication pursuant to Article 94(3) EPC dated Jul. 23, 2024, directed to EP Application No. 21819300.1; 5 pages.

* cited by examiner

MODULAR ELEVATOR SYSTEMS AND METHODS

CROSS-REFERENCE TO RELATED APPLICATION

This application is a National Stage Application under 35 U.S.C. § 371 of PCT/US2021/058724 filed on Nov. 10, 2021, which claims priority benefit from U.S. Provisional Patent Application No. 63/111,989, filed on Nov. 10, 2020, the entire content of each of which is incorporated herein by reference.

TECHNICAL FIELD

The subject matter disclosed herein relates generally to the construction of modular construction units. In particular, the presently disclosed subject matter relates to a system for constructing a wall section for use in a modular construction unit, as well as associated methods of manufacture thereof.

BACKGROUND

Elevators are generally viewed as almost an essential amenity in newly constructed buildings, both residential and/or commercial, to allow for ease of transport of people, furnishings, and the like between different stories, or storeys, of the building. However, conventional construction techniques involve constructing a dedicated space for the shaft of the elevator, then affixing all of the components of the elevator system to the interior surfaces of the shaft, a time-consuming and labor-intensive process.

Advances continue in the field of modular construction, in which buildings are constructed from a plurality of pre-fabricated modular building units assembled together according to a plan of assembly for the final structure of the building. Such modular building units can include, for example, one or more rooms within the building. However, even in known modular construction techniques, the standard practice in elevator construction remains an on-site construction of a structure for the elevator shaft, either prior to or simultaneous with the assembly of the other modular building units, around which the modular building units are assembled. In fact, the methods of construction for elevator systems in buildings, even within modularly constructed buildings, remains unchanged. Some have attempted to build the entire shaft offsite which is then shipped horizontally on a flatbed truck and then erected vertically as a single shaft which still creates many limitations. As such, a need exists for modular elevator systems, as well as for methods of producing and/or assembling a modular elevator system.

SUMMARY

According to a first example aspect, a modular elevator system is provided herein, the modular elevator system comprising: a pit module; one or more shaft modules configured for attachment to the pit module and/or to an adjacent one of the one or more shaft modules; and a cap module configured for attachment to an uppermost shaft module of the one or more shaft modules; wherein each of the pit module, the one or more shaft modules, and the cap module are pre-fabricated and configured for transport to, and assembly at, a site at which a building is under construction; and wherein the modular elevator system is configured for installation within the building either independently or as a component within a volumetric box.

In some embodiments of the modular elevator system, the one or more shaft modules comprises a plurality of shaft modules, each of the plurality of shaft modules being sequentially stacked on top of the pit module and/or a previously stacked shaft module of the plurality of shaft modules.

In some embodiments of the modular elevator system, a shaft module and/or a cap module can be embedded within a modular volumetric box structure that contains floors, walls, and a ceiling and can be installed as a combined structure and then these combined structures can be stacked on each other.

In some embodiments of the modular elevator system, a quantity of the plurality of shaft modules is a same number as a quantity of stories of the building.

In some embodiments of the modular elevator system, the one or more shaft modules comprise a plurality of shaft modules, the plurality of shaft modules being stacked sequentially on top of each other to define an elevator shaft extending between the pit module and the cap module.

In some embodiments of the modular elevator system, a quantity of the plurality of shaft modules is a same number as a quantity of stories of the building.

In some embodiments of the modular elevator system, the pit module is positioned on and supported by a foundation.

In some embodiments of the modular elevator system, the pit module comprises outer walls, elevator guide rails attached to at least some of the outer walls, and a pit ladder attached to one of the outer walls.

In some embodiments of the modular elevator system, the pit module comprises a power unit for a hydraulic-type elevator system or a traction pulley and counterweight rails for a traction-type elevator system.

In some embodiments of the modular elevator system, each shaft module comprises outer walls, elevator guide rails, an elevator door opening and elevator door, and, optionally, counterweight rails for guiding a counterweight through each shaft module for a traction-type elevator system.

In some embodiments of the modular elevator system, the outer walls of the shaft module define an elevator shaft, along which an elevator cab is movable.

In some embodiments of the modular elevator system, one of the shaft modules comprises an elevator controller.

In some embodiments of the modular elevator system, prior to assembly of the modular elevator system, one of the shaft modules is configured for securing an elevator cab and an elevator cab carrying frame therein during transport.

In some embodiments of the modular elevator system, each of the shaft modules comprises a counterweight frame for rigidly attaching the counterweight rails to the outer walls thereof for guiding the counterweight through the each of the shaft modules.

In some embodiments of the modular elevator system, the cap module comprises a hoist beam, a power connection, and elements that support elevator cab movements.

In some embodiments of the modular elevator system, the elements that support elevator cab movements comprise a traction motor for a traction-type elevator system.

In some embodiments of the modular elevator system, each of the pit module, the shaft modules, and the cap module comprise self-aligning connectors configured to ensure precise alignment of adjacent ones of the pit module, the shaft modules, and the cap module.

In some embodiments of the modular elevator system, each of the plurality of shaft modules has a width such that multiple elevator cabs can pass through each shaft module simultaneously in parallel.

In some embodiments of the modular elevator system, each of the pit module, the plurality of shaft modules, and the cap module have some or all of the operating components (e.g., "elevator hardware," including rails, hoist beams, hydraulics, electrical components, safety hardware, elevator cab(s), traction pulleys, motors, and any other components necessary for the modular elevator system to be operational) installed therein during pre-fabrication, such that, upon the pit module, the plurality of shaft modules, and the cap module being stacked to form the assembled modular elevator system, some or substantially all (e.g., all) of the elevator mechanical installation is completed.

According to a second example aspect, a method of assembling a modular elevator system is provided herein, the method comprising: pre-fabricating a pit module; pre-fabricating one or more shaft modules; pre-fabricating a cap module; transporting the pit module, the one or more shaft modules, and the cap module to a site at which a building is under construction; positioning a pit module at a designated position for the building under construction; attaching a first of the one or more shaft modules to the pit module; and attaching the cap module to the one or more shaft modules of the plurality of shaft modules.

In some embodiments of the method, the one or more shaft modules are a plurality of shaft modules, the method comprising, after a first of the plurality of shaft modules is attached to the pit module, sequentially attaching each other shaft module of the plurality of shaft modules to an adjacent previously attached shaft module of the plurality of shaft modules.

In some embodiments of the method, one or more of the pit module, the one or more shaft modules, and the cap module are assembled independently of each other within or to the building.

In some embodiments of the method, one or more of the pit module, the one or more shaft modules, and the cap module are assembled as a component within a volumetric box of the building under construction.

In some embodiments of the method, a quantity of the plurality of shaft modules is a same number as a quantity of stories of the building.

In some embodiments of the method, the one or more shaft modules are a plurality of shaft modules that are stacked sequentially between the pit module and the cap module.

In some embodiments of the method, the pit module is positioned on and supported by a foundation.

In some embodiments of the method, the pit module comprises outer walls, elevator guide rails attached to at least some of the outer walls, and a pit ladder attached to one of the outer walls.

In some embodiments of the method, the pit module comprises a power unit for a hydraulic-type elevator system or a traction pulley and counterweight rails for a traction-type elevator system.

In some embodiments of the method, each shaft module comprises outer walls, elevator guide rails, an elevator door opening and elevator door, and, optionally, counterweight rails for guiding a counterweight through each shaft module for a traction-type elevator system.

In some embodiments of the method, the outer walls of the shaft module define an elevator shaft, along which an elevator cab is movable.

In some embodiments of the method, at least one of the shaft modules comprises an elevator controller.

In some embodiments of the method, pre-fabricating the plurality of shaft modules comprises securing an elevator cab and an elevator cab carrying frame within one of the shaft modules, and wherein the one of the shaft modules is transported with the elevator cab and elevator cab carrying frame installed therein.

In some embodiments of the method, at least one of the plurality of shaft modules comprises a counterweight frame for rigidly attaching the counterweight rails to the outer walls thereof for guiding the counterweight through the each of the shaft modules.

In some embodiments of the method, the cap module comprises a hoist beam, a power connection, and elements that support elevator cab movements.

In some embodiments of the method, the elements that support elevator cab movements comprise a traction motor for a traction-type elevator system.

In some embodiments of the method, each of the pit module, the shaft modules, and the cap module comprise self-aligning connectors configured to ensure precise alignment of adjacent ones of the pit module, the shaft modules, and the cap module.

In some embodiments of the method, each shaft module has a width such that multiple elevator cabs can pass through each shaft module simultaneously in parallel.

In some embodiments of the method, each of the pit module, the plurality of shaft modules, and the cap module have some or all of the operating components (e.g., "elevator hardware," including rails, hoist beams, hydraulics, electrical components, safety hardware, elevator cab(s), traction pulleys, motors, and any other components necessary for the modular elevator system to be operational) installed therein during pre-fabrication, such that, upon the pit module, the plurality of shaft modules, and the cap module being stacked to form the assembled modular elevator system, some or substantially all (e.g., all) of the elevator mechanical installation is completed.

DETAILED DESCRIPTION

Figure 1:
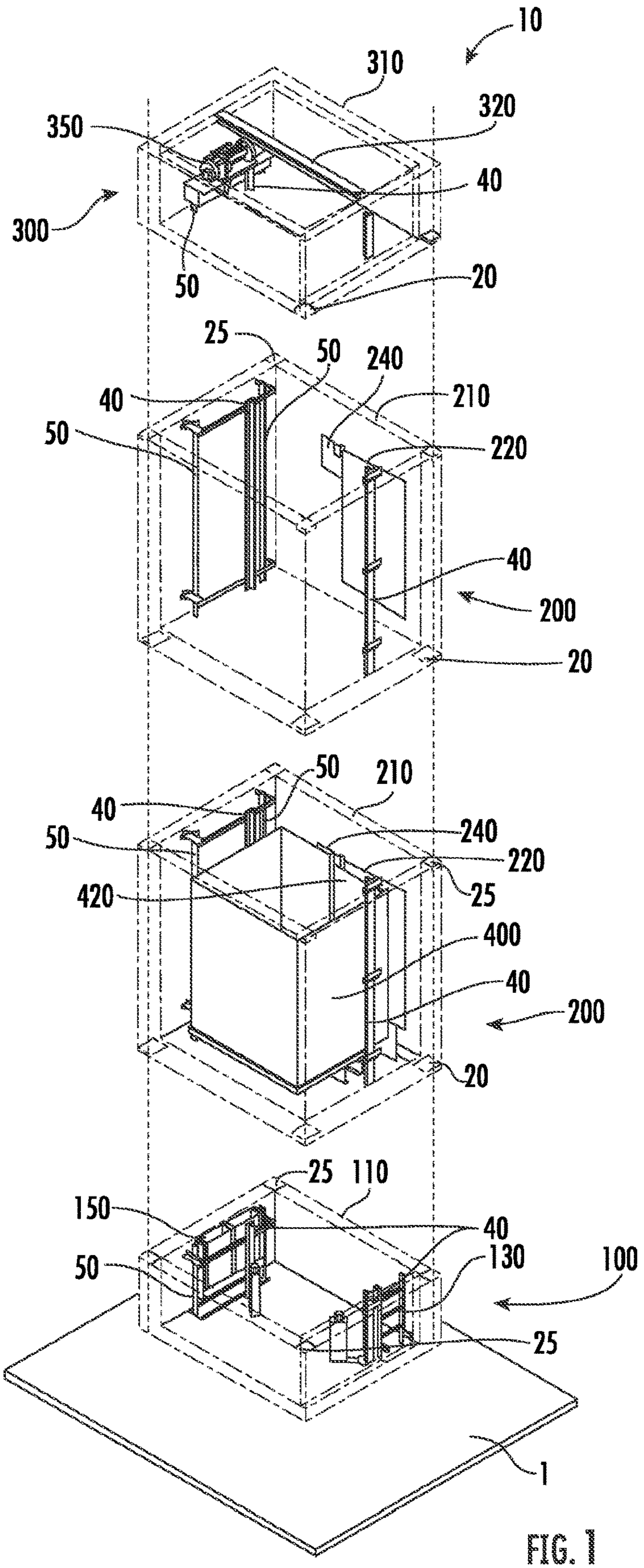
FIG. 1 is an exploded view of an example embodiment of a modular elevator system, according to the disclosure herein.

The accompanying figures and description are merely examples of a single example embodiment for a modular elevator system, as well as methods of production and assembly therefor. As such, the foregoing description and accompanying figures are illustrative and are not to be used to limit the scope of the presently disclosed subject matter.

Unless defined otherwise, all technical and scientific terms used herein have the same meaning as commonly understood to one having ordinary skill in the art to which the presently disclosed subject matter belongs. Although, any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "an outer wall" can include a plurality of such outer walls, and so forth.

Unless otherwise indicated, all numbers expressing quantities of length, diameter, width, and so forth used in the specification and claims are to be understood as being modified in all instances by the terms "about" or "approximately". Accordingly, unless indicated to the contrary, the numerical parameters set forth in this specification and attached claims are approximations that can vary depending upon the desired properties sought to be obtained by the presently disclosed subject matter.

As used herein, the terms "about" and "approximately," when referring to a value or to a length, width, diameter, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate for the disclosed apparatuses and devices.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

FIG. 1 is an exploded view showing an example embodiment for a modular elevator system, generally designated 10, which is suitable for use (e.g., installation) in a building (e.g., any suitable structure in which an elevator may be installed, whether in new construction or in retrofitting applications). For example, the modular elevator system 10 is suitable for installation within the building while the building is being constructed; the modular elevator system 10 is particularly suitable for installation within a building being constructed in a modular manner. The term "modular" as used herein refers generally to the construction technique in which modular units (e.g., comprising one or more rooms and/or portions of such rooms) from which the building is to be assembled are pre-fabricated (e.g., away from the construction site, such as in a factory) according to the schematics (e.g., blueprints) for the building under construction, transported to the construction site in a manner that the modular units are not permanently attached to each other prior to or during transport, and assembled to each other in the order, placement, and orientation indicated for the schematics of the building under construction. According to this example embodiment, the components of the modular elevator system 10 are pre-fabricated prior to being installed within the building under construction. For example, the number of modular units produced as part of the modular elevator system corresponds to (e.g., is the same as, or a multiple of) the number of stories (e.g., the number of modular units stacked on top of each other to form the building under construction) of the building under construction. As shown in FIG. 1, the modular elevator system 10 comprises a pit module, generally designated 100, one or more shaft modules, generally designated 200, and a cap module, generally designated 300. In the example embodiment shown, the one or more shaft modules 200 are a plurality of shaft modules 200. The quantity of shaft modules 200 is advantageously the same as or less than the quantity of occupiable stories within the building after construction is complete.

As shown in FIG. 1, the pit module 100 is arranged over and/or rigidly attached to a suitably rigid and robust foundation 1 (e.g., a reinforced poured concrete slab). While the foundation 1 may in some embodiments include a foundation that is attached to the pit module 100 during pre-fabrication, in the example embodiment shown, the foundation 1 is advantageously (e.g., due to weight) prepared at the construction site where the building is under construction and, after the foundation 1 has been adequately prepared and/or constructed, the pit module 100 is positioned on and/or attached to the foundation 1. Further aspects of the pit module 100 will be described elsewhere herein, for example, in the description of FIG. 2. A first shaft module 200 is positioned on top of, aligned with, and secured to the pit module 100, such that the bottom surface of the first shaft module 200 is adjacent to (e.g., in direct contact with) the top surface of the pit module 100. A second shaft module 200 is positioned on top of, aligned with, and secured to the first shaft module 200, such that the bottom surface of the second shaft module 200 is adjacent to (e.g., in direct contact with) the top surface of the first shaft module 200. This process of sequentially stacking each shaft module 200 on top of a previously positioned and attached shaft module 200 is repeated until all of the shaft modules 200 of the modular elevator system 10 have been secured to and/or within the building being constructed. After the final shaft module 200 has been positioned on, aligned with, and attached to the penultimate shaft module 200, a cap module 300 is positioned over, aligned with, and attached to the final shaft module 200. The cap module 300 is positioned such that the bottom surface of the cap module 300 is adjacent to (e.g., in direct contact with) the top surface of the final shaft module 200.

Figure 2:
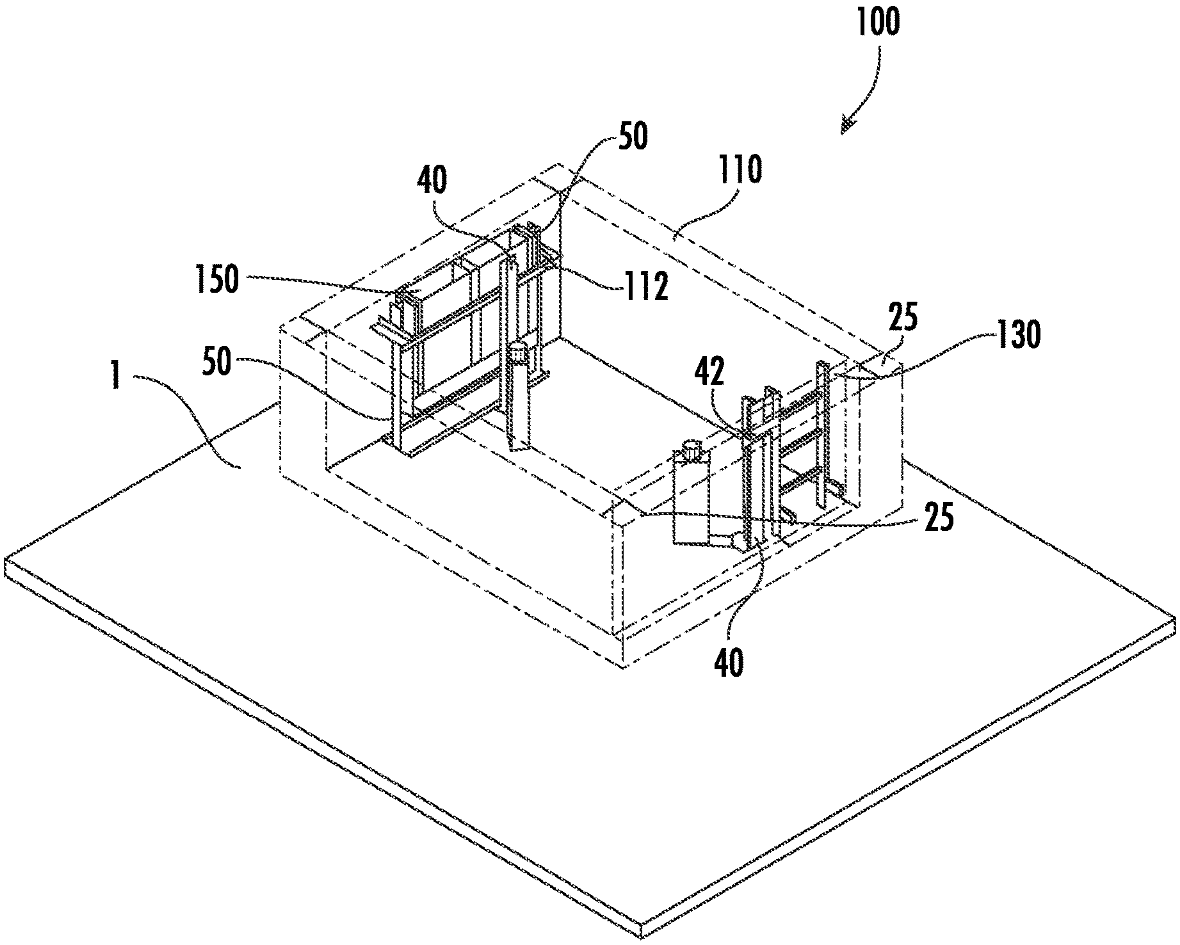
FIG. 2 is an isometric view of an example embodiment of a pit module for the example modular elevator system of FIG. 1.

FIG. 2 shows an example embodiment of the pit module 100 of the modular elevator system 10 shown in FIG. 1. The pit module 100 has outer walls 110 that define the width and length of the modular elevator system 10. In cartesian coordinates, the width can be referred to as extending in the x-direction, the length can be referred to as extending in the y-direction, and the height of the modular elevator system 10 can be referred to as extending in the z-direction. These outer walls 110 thus define a perimeter of the modular elevator system 10. The outer walls 110 rest on and are fastened to the foundation 1 (e.g., a site-poured concrete pit floor). The foundation 1 is configured to support all vertical loads of the components of the modular elevator system 10, including, for example and without limitation, hydraulic lifts, counterweights, guide rails, buffers, and the like. Portions of elevator guide rails 40, which are provided for aligning the elevator cab within the volume defined by the pit module 100, the shaft module(s) 200, and the cap module 300, which can be referred to collectively as the "elevator shaft," during transit of the elevator cab 400 through the elevator shaft are installed within the pit module 100 and are connected to the outer walls 110 (e.g., to opposing outer walls 110) during pre-fabrication of the pit module 100. The power unit (e.g., pump, motor, valve, etc.) for hydraulic-type elevator systems and/or a traction pulley and counterweight rails for traction-type elevator systems are also arranged in the pit module 100 during pre-fabrication of the pit module 100.

A counterweight frame 112 is rigidly attached to one of the outer walls 110 of the pit module 100. The counterweight frame 112 can have any suitable shape, but in the example embodiment shown, the counterweight frame 112 has a generally rectangular cross-section and defines, in conjunction with the adjacent surface of the outer wall 110 to which the counterweight frame 112 is attached, a region in which a counterweight 150 is movably positioned. The counterweight 150 is attached, during operation of the modular elevator system 10, to the elevator cab 400 by a tether. The movement of the counterweight 150 is defined by the counterweight rails 50, which are rigidly connected to the counterweight frame 112 and are positioned on opposite sides of the counterweight 150, such that the counterweight 150 can move parallel to the counterweight rails 50, but cannot move outside the boundary defined by the counterweight frame 112. In the example embodiment shown, one of the elevator guide rails 40 is connected (e.g., directly) to the counterweight frame 112, such that this elevator guide rail 40 is not directly connected to any of the outer walls 110 of the pit module 100. In some embodiments, the pit module 100 comprises one or more stops, or bumpers 2, which are supported on the foundation 1 and define a minimum distance, or position, of the elevator cab 400 from the foundation 1 (e.g., vertically, within the elevator shaft) within the pit module 100.

The pit module 100 also comprises a pit ladder 130, which is attached to at least one of the outer walls 110 during pre-fabrication of the pit module 100. The pit ladder extends vertically down, from adjacent the top surface of the outer wall 110 to which it is connected, in the direction of the foundation 1, in order to allow access of authorized service personnel to the components of the modular elevator system 10 that are positioned within the pit module 100 for repair and maintenance of such components of the modular elevator system 10 arranged therein. A plurality of self-aligning connectors 20 are provided along the upper surface (e.g., the surface farthest away from the foundation) of the outer walls 110 of the pit module 100. These self-aligning connectors 20 engage with corresponding retention features 25 associated with (e.g., attached to) the first shaft module 200, which is to be installed above the pit module 100. In the example embodiment shown, the self-aligning connectors 20 are arranged at each intersection of the outer walls 110 (e.g., where the outer walls 110 form a corner) of the pit module 100 and are rigidly attached to the outer walls 110. In the example embodiment shown, the self-aligning connector 20 and the retention feature 25 of the shaft module 200 are provided, for example, with complementary geometric shapes that provide for progressive alignment of the self-aligning connector 20 and the retention feature 25 as one is progressively engaged further within the other. An example of such a complementary geometric shapes includes, for example, a frustoconical protrusion formed on the retention feature 25 and a frustoconical recess formed on the self-aligning connector 20. Any suitable quantity and arrangement of the self-aligning connectors 20 can be provided about the outer walls 110 of the pit module 100 to allow for suitably precise alignment and rigid attachment of the pit module 100 and the first shaft module 200 attached thereto.

Figure 3:
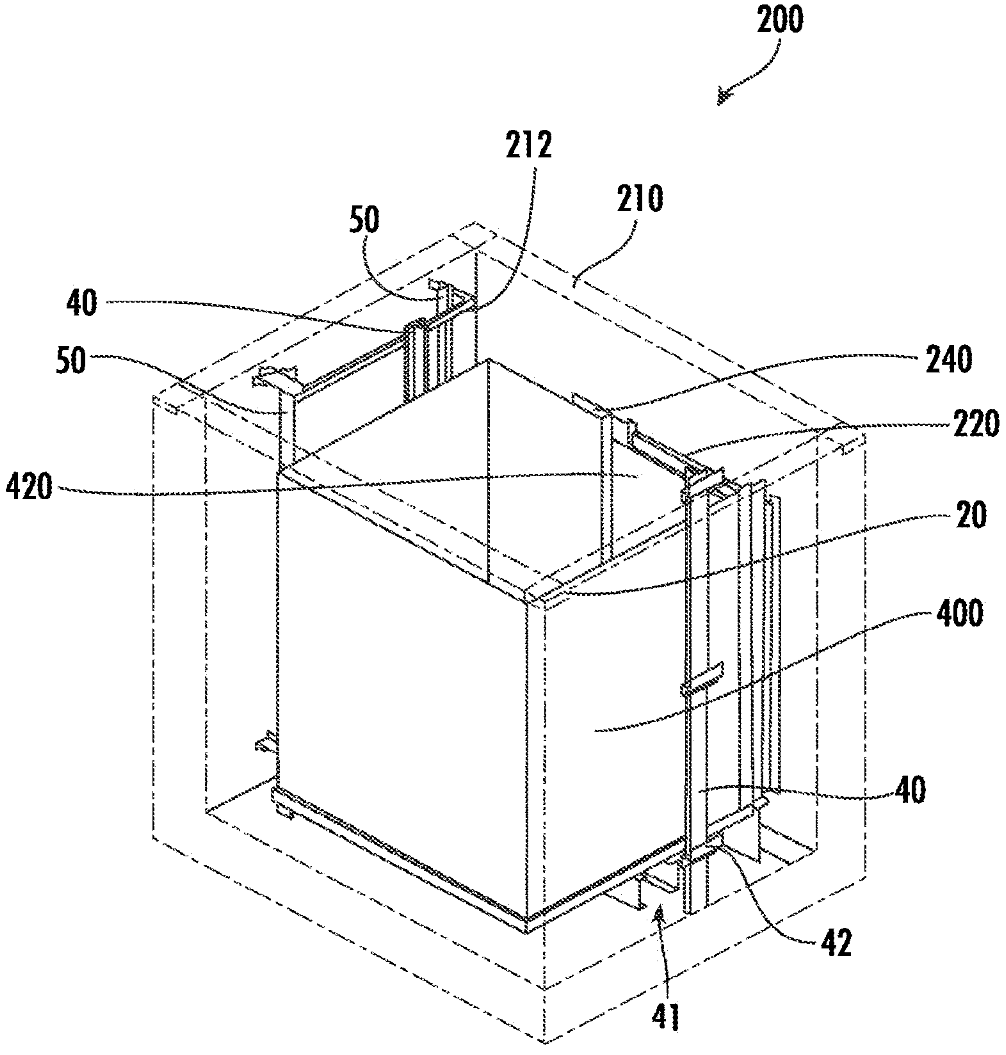
FIG. 3 is an isometric view of an example embodiment of a shaft module for the example modular elevator system of FIG. 1.

FIG. 3 shows an example embodiment of the shaft module 200 of the modular elevator system 10 of FIG. 1. Any quantity of shaft modules 200 can be joined sequentially together in forming the elevator shaft of the modular elevator system 10, such that the elevator shaft of the modular elevator system 10 can have substantially any height, thereby allowing for use in any suitable structure. While the shaft modules may have any suitable dimensions, in the example embodiment shown, each shaft module has a height that corresponds to (e.g., is the same as, allowing for manufacturing tolerances) the pitch between stories, or levels, of the building under construction, in which the shaft module is installed. For example, one or more stories of a building may have a different height from other stories of the building; in such case, the shaft module 200 that is designated to be installed in each story will advantageously have a height that corresponds to the height of the story on which the shaft module 200 is installed. In some embodiments, the height of the shaft module may be dictated by the available transport options (e.g., what is practical to transport on public roadways) for transporting the shaft module to the site where the building is under construction. Thus, a shaft module 200 may have a height that is greater than a single story of the building and may be installed to provide access to multiple stories of a building via the elevator cab 400. By way of example, a building having 4 stories that span a height of 40 feet can have a single shaft module 200 that is about 40 feet high and has, for example, an elevator door opening 220 provided through the outer wall 210 in a position for each story of the building, such that each story has an elevator door opening 220 that provides access to the elevator cab 400 from such story when the elevator cab 400 is present at such floor of the building. The term "story" as used herein is intended to be commensurate with the ordinary meaning of the word, for example, the space in a building between two adjacent floor levels or between a floor and the roof. The outer walls 210 of each shaft module 200 form a structural frame that is configured and dimensioned to support the components that define the height of the elevator shaft, including other shaft modules 200 and the cap module 300.

Structural supports, such as elevator guide rails 40, counterweight rails 50 for traction-type elevator systems, as well as all other safety and operational elements in the shaft, which can include the elevator controller 240, can be installed within and connected to the outer wall 210 of one or more of (e.g., a plurality of, or each) the shaft modules 200. An elevator door opening 220 is formed within (e.g., entirely through the thickness of) one or more of the outer walls 210 of the shaft module 200. The elevator door opening 220 is positioned such that a bottom edge of the elevator door opening 220 is substantially coplanar with the floor of the story of the building into which the elevator door opening 220 is configured to provide access. The elevator door opening 220 can be configured to accommodate an elevator door of any suitable design and, as noted elsewhere, any quantity of such elevator door openings 220 can be provided based on the height of the shaft module 200. In some embodiments, opposing outer walls 210 can each have an elevator door opening 220 formed therethrough, such that the elevator cab 400 can be loaded and/or unloaded from multiple directions.

The elevator cab 400 and an elevator cab carrying frame 41, which can include the counterweight 150, the counterweight frame 212 (e.g., for traction elevators, such as shown in the example embodiment), and/or the counterweight rails 50 can be installed within any of the shaft modules 200.

Retention features 25 are arranged at the bottom surface of each shaft module 200. Self-aligning connectors 20 are arranged at the top surface of the shaft module 200. The retention features 25 of a shaft module are configured for secure attachment to (e.g., via locking insertion within) a corresponding one of the self-aligning connectors 20 of either the pit module 100 or a shaft module 200 positioned immediately adjacent thereto (e.g., directly underneath, in a stacked configuration). The type of these retaining features 25 and self-aligning connectors 20 in joining together adjacent modular units (e.g., pit module 100 to shaft module 200, shaft module 200 to other shaft module 200, and shaft module 200 to cap module 300) are selected based on load requirements necessary to secure each shaft module 200 to an adjacent shaft module 200, pit module 100, or cap module 300. A self-aligning connector 20 is provided at, on, and/or in the top surface of each shaft module 20, such that the self-aligning connector 20 can engage with a corresponding retention feature 25 of a bottom surface of an adjacent shaft module 200 or of a cap module 300, which is arranged immediately above the shaft module 200. In the example embodiment shown, the self-aligning connectors 20 and the retention features 25 are arranged at each corner on the top surface and the bottom surface, respectively, of the shaft modules 200 and are rigidly attached to the outer walls 210 where the outer walls 210 intersect each other. Any suitable quantity and arrangement of the self-aligning connectors 20 and retention features 25 can be provided about the outer walls 210 of each shaft module 200 to allow for suitably precise alignment and rigid attachment of the pit module 100 and the first shaft module 200, of immediately adjacent shaft modules 200, and/or of the top, or final, shaft module 200 and the cap module 300. Shaft modules 200 are stacked sequentially on top of each other (e.g., based on the number of stories in the building under construction) until a modular elevator system 10 having the height specified in the schematics of the building under construction has been formed.

In some embodiments, the self-aligning connectors 20 and the retention features 25 form respective halves, or portions, of a single connector. The positioning of some or all of the self-aligning connectors 20 and the retention features 25 can be reversed from the orientation shown in the example embodiment shown in FIGS. 1-4. Thus, some or all of the retention features 25 can be attached to the respective top surfaces of the pit module 100 and the shaft modules 200 and some or all of the self-aligning connectors 20 can be attached to the respective bottom surfaces of the shaft modules 200 and the cap module 300.

Figure 4:
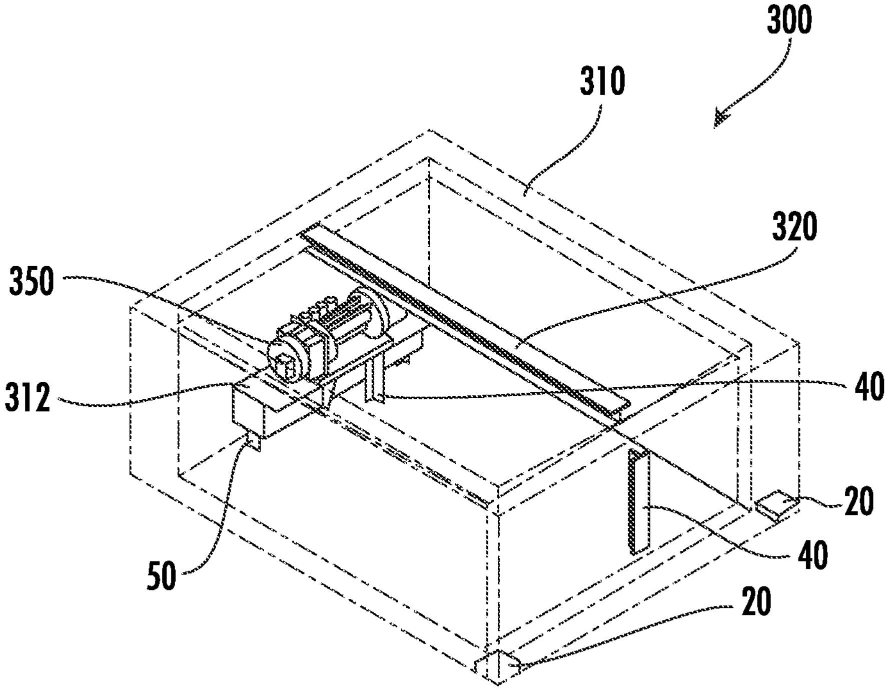
FIG. 4 is an isometric view of an example embodiment of a cap module for the example modular elevator system of FIG. 1.

FIG. 4 shows an example embodiment of the cap module, generally designated 300, of the modular elevator system 10 of FIG. 1. The cap module 300 is positioned over, aligned with, and attached to the top surface of the final (e.g., uppermost) shaft module 200 of the modular elevator system 10. Since the modular elevator system 10 is a traction-type elevator system, the cap module 300 contains a traction motor 350, a hoist beam 320, beneath which the elevator cab 400 is suspended within the elevator shaft in a vertically mobile manner, power connections, and other operational elements that support vertical movements of the elevator cab 400 along substantially the entire length of the elevator shaft (e.g., allowing for keep-out spaces within the pit module 100 and the cap module 300, such as may be needed for service and/or maintenance). A plurality of retention features 25 are provided at, on, and/or in the bottom surface of the outer walls 310 of the cap module 300. Each retention feature is positioned to engage with (e.g., via progressive engagement and/or insertion) a corresponding one of the self-aligning connectors 20 provided at, on, and/or in the top surface of the shaft module 200 that is arranged immediately below the cap module 300. In the example embodiment shown, the retention features 25 are arranged at each corner (e.g., where outer walls 310 intersect each other) of the cap module 300 and are rigidly attached to the outer walls 310. Any suitable quantity and arrangement of the retention features 25 can be provided about, on, and/or in the outer walls 310 of the cap module 300 to allow for suitably precise alignment and rigid attachment of the cap module 300 and an adjacent shaft module 200.

One or more of the pit module 100, the shaft module(s) 200, and the cap module 300 have some or all of the operating components (e.g., “elevator hardware,” including elevator guide rails 40, hoist beam(s) 320, hydraulic components, electrical components, safety hardware, elevator cab(s) 400, traction pulleys, traction motors, and any other components necessary for safe operation of the modular elevator system 10) installed therein during pre-fabrication of each respective pit module 100, shaft module 200, and/or cap module 300. As such, upon the pit module 100, the shaft module(s) 200, and the cap module 300 being stacked in the specified arrangement to form the assembled modular elevator system 10, some or substantially all (e.g., all) of the elevator mechanical installation is completed. By way of example, the elevator guide rails 40 and/or the counterweigh rails 50 can extend entirely to an external boundary of the respective pit module 100, shaft module 200, or cap module 300 in which such elevator guide rails 40 and/or counterweight rails are positioned, such that when such elevator guide rails 40 and/or counterweight rails 50 are substantially continuous, when assembled together in an end-to-end manner, along the entire length of the elevator shaft. Thus, the elevator guide rails 40 and/or the counterweight rails 50 can have a length (e.g., in the z-direction) that is substantially the same as the height of the pit module 100 or shaft module 200 in which such elevator guide rails 40 and/or counterweight rails 50 are installed. Similarly, connectors for hydraulic lines and/or electrical lines can be provided at, or protruding beyond, the respective top and/or bottom surfaces of the modular unit (e.g., pit module 100, shaft module 200, cap module 300) in which they are installed. Such operating components are installed during prefabrication of the modular units with sufficient precision to ensure proper engagement with a corresponding operating component in an adjacent modular unit.

All electrical and communication wiring, including safety and other operational elements, are installed in each of the pit module 100, the shaft modules 200, and the cap module 300 to allow for quick connections to the adjacent modular units (e.g., the pit module 100, the shaft modules 200, and/or the cap module 300) attached above and/or below.

One of the shaft modules 200 is shown in FIG. 1 as containing an elevator cab 400, which can be delivered to the construction site secured within the shaft module 200 or separately from the shaft module 200. While each modular elevator system can comprise any suitable number of elevator cabs 400, it is envisioned that the vast majority of modular elevator systems 10 will have only a single elevator cab 400 that can travel within and through each of the shaft modules 200 that form the majority of the modular elevator system 10. However, embodiments in which multiple elevator cabs 400 are provided within the modular elevator system 10 are within the scope of the subject matter disclosed herein as well.

After fabrication, the cap module 100, the one or more shaft modules 200, and the pit module 300 are transported to the construction site, where the building is under construction, as discrete modules. The number of modular units of the modular elevator system corresponds to a height of the building under construction. The order in which the building modules are constructed and/or transported to the site where the building is under construction advantageously corresponds to a specific height specification associated with a height of the floor of the structure currently being assembled, or about to be assembled, or to a quantity that is capable of being transported on a conveyance (e.g., a truck, trailer, ship, locomotive, etc.). After being transported to the site where the building is under construction, the modular units are installed (e.g., in the order specified according to the building schematics) with minimal onsite work in preparing the modular units for assembly as part of the building under construction being necessary. The modular elevator systems disclosed herein are suitable for use in assembling an elevator system of any type (e.g., hydraulic or traction type elevator systems). In some embodiments, the modular units can be embedded within a volumetric box that contains floors, walls, and ceilings and transported to the site and then stacked sequentially vertically (e.g., by stacking each volumetric box on top of a previously positioned volumetric box).

The example embodiment of the modular elevator system 10 is shown herein as containing components that can only allow for a single elevator cab 400 to pass through a shaft module 200 at the same time. However, example embodiments are envisioned in which each cap module 300, shaft module 200, and/or pit module 100 is configured to allow a plurality of elevator cabs 400 to pass through a shaft module 200 at the same time, in which the modular elevator system 10 would comprise multiple elevator cabs 400 that can move simultaneously with each other along the entire height of the assembled shaft modules 200. Thus, such elevator cabs 400 can be referred to as operating in parallel, such that each such cap module 300, shaft module 200, and/or pit module 100 has a width that is greater than a multiple of the width of the elevator cab 400, the multiple being determined by the quantity of elevator cabs 400 that can be operated in parallel and/or simultaneously. The other components of the modular elevator system 10, other than the respective outer walls 110, 210, 310, are duplicated for each of the elevator cabs 400 that the modular elevator system 10 is configured to operate in parallel and/or simultaneously.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

The invention claimed is:

1. A modular elevator system comprising:

a pit module including at least one of a self-aligning connector or a retention feature on a top surface of the pit module;

one or more shaft modules configured for attachment to the pit module and/or to an adjacent one of the one or more shaft modules, the one or more shaft modules including a self-aligning connector on one of a top surface or a bottom surface of the one or more shaft modules and a retention feature on the other of the top surface or the bottom surface of the one or more shaft modules; and a cap module configured for attachment to an uppermost shaft module of the one or more shaft modules, the cap module including at least one of a self-aligning connector or a retention feature on a bottom surface of the cap module, wherein each of the pit module, the one or more shaft modules, and the cap module are pre- fabricated and configured for transport to, and assembly at, a site at which a building is under construction, wherein the modular elevator system is configured for installation within the building either independently or as a component within a volumetric box, wherein, prior to assembly of the modular elevator system, an elevator cab and an elevator cab carrying frame are secured in one of the one or more shaft modules during transport, the elevator cab carrying frame supporting the elevator cab thereon during the transport, wherein a first of the one or more shaft modules is attached to the pit module by stacking the first of the one or more shaft modules onto the pit module and progressively engaging the self-aligning connector or the retention feature on the bottom surface of the first of the one or more shaft modules with the at least one of the self-aligning connector or the retention feature of the pit module for progressive alignment of the self-aligning connector or the retention feature of the first of the one or more shaft modules and the at least one of the self-aligning connector or the retention feature of the pit module as the first of the one or more shaft modules is stacked onto the pit module, and wherein the cap module is attached to the one or more shaft modules by stacking the cap module onto the one or more shaft modules and progressively engaging the at least one of the self-aligning connector or the retention feature of the cap module with the self-aligning connector or the retention feature on the top surface of the one or more shaft modules as the cap module is stacked onto the one or more shaft modules.

2. The modular elevator system of claim 1, wherein the one or more shaft modules comprises a plurality of shaft modules, each of the plurality of shaft modules being sequentially stacked on top of the pit module and/or a previously stacked shaft module of the plurality of shaft modules.

3. The modular elevator system of claim 2, wherein a quantity of the plurality of shaft modules is a same number as a quantity of stories of the building.

4. The modular elevator system of claim 1, wherein the one or more shaft modules comprise a plurality of shaft modules, the plurality of shaft modules being stacked sequentially on top of each other to define an elevator shaft extending between the pit module and the cap module.

5. The modular elevator system of claim 4, wherein a quantity of the plurality of shaft modules is a same number as a quantity of stories of the building.

6. The modular elevator system of claim 1, wherein the pit module is positioned on and supported by a foundation.

7. The modular elevator system of claim 1, wherein the pit module comprises outer walls, elevator guide rails attached to at least some of the outer walls, and a pit ladder attached to one of the outer walls.

8. The modular elevator system of claim 7, wherein the pit module comprises a power unit for a hydraulic-type elevator system or a traction pulley and counterweight rails for a traction-type elevator system.

9. The modular elevator system of claim 1, wherein each shaft module comprises outer walls, elevator guide rails, an elevator door opening and an elevator door.

10. The modular elevator system according to claim 9, wherein the outer walls of the shaft module define an elevator shaft, along which an elevator cab is movable.

11. The modular elevator system of claim 9, wherein at least one of the one or more shaft modules comprises an elevator controller.

12. The modular elevator system of claim 1, wherein the cap module comprises a hoist beam, a power connection, and elements that support elevator cab movements.

13. The modular elevator system of claim 12, wherein the elements that support elevator cab movements comprise a traction motor for a traction-type elevator system.

14. The modular elevator system of claim 1, wherein each of the one or more shaft modules comprises counterweight rails for guiding a counterweight through each shaft module for a traction-type elevator system.

15. The modular elevator system of claim 14, wherein each of the one or more shaft modules includes outer walls and comprises a counterweight frame for rigidly attaching the counterweight rails to the outer walls for guiding the counterweight through the each of the one or more shaft modules.

16. The modular elevator system of claim 1, wherein the pit module, the one or more shaft modules, and the cap module each comprise outer walls that intersect with each other at an intersection.

17. The modular elevator system of claim 16, wherein the self-aligning connectors and the retention features are positioned at the intersection of the outer walls.

18. A method of assembling a modular elevator system, the method 18. comprising:

pre-fabricating a pit module, the pit module including at least one of a self-aligning connector or a retention feature on a top surface of the pit module;

pre-fabricating one or more shaft modules, the one or more shaft modules including a self-aligning connector on one of a top surface or a bottom surface of the one or more shaft modules and a retention feature on the other of the top surface or the bottom surface of the one or more shaft modules, wherein pre-fabricating the one or more shaft modules comprises securing an elevator cab and an elevator cab carrying frame within one of the one or more shaft modules, and wherein the one of the one or more shaft modules is transported with the elevator cab and elevator cab carrying frame installed therein, the elevator cab carrying frame supporting the elevator cab thereon;

pre-fabricating a cap module, the cap module including at least one of a self-aligning connector or a retention feature on a bottom surface of the cap module;

transporting the pit module, the one or more shaft modules, and the cap module to a site at which a building is under construction;

positioning a pit module at a designated position for the building under construction;

attaching a first of the one or more shaft modules to the pit module by stacking the first of the one or more shaft modules onto the pit module and progressively engaging the self-aligning connector or the retention feature on the bottom surface of the first of the one or more shaft modules with the at least one of the self-aligning connector or the retention feature of the pit module for progressive alignment of the self-aligning connector or the retention feature of the first of the one or more shaft modules and the at least one of the self-aligning connector or the retention feature of the pit module as the first of the one or more shaft modules is stacked onto the pit module; and attaching the cap module to the one or more shaft modules by stacking the cap module onto the one or more shaft modules and progressively engaging the at least one of the self-aligning connector or the retention feature of the cap module with the self-aligning connector or the retention feature on the top surface of the one or more shaft modules as the cap module is stacked onto the one or more shaft modules.

19. The method of claim 18, wherein the one or more shaft modules are a plurality of shaft modules, the method comprising, after a first of the plurality of shaft modules is attached to the pit module, sequentially attaching each other shaft module of the plurality of shaft modules to an adjacent previously attached shaft module of the plurality of shaft modules.

20. The method of claim 18, wherein one or more of the pit module, the one or more shaft modules, and the cap module are assembled independently of each other within or to the building.

21. The method of claim 18, wherein one or more of the pit module, the one or more shaft modules, and the cap module are assembled as a component within a volumetric box of the building under construction.

22. The method of claim 18, wherein a quantity of the one or more shaft modules is a same number as a quantity of stories of the building.

23. The method of claim 18, wherein the one or more shaft modules are a plurality of shaft modules that are stacked sequentially between the pit module and the cap module.

24. The method of claim 18, wherein the pit module is positioned on and supported by a foundation.

25. The method of claim 18, wherein the pit module comprises outer walls, elevator guide rails attached to at least some of the outer walls, and a pit ladder attached to one of the outer walls.

26. The method of claim 25, wherein the pit module comprises a power unit for a hydraulic-type elevator system or a traction pulley and counterweight rails for a traction-type elevator system.

27. The method of claim 18, wherein each shaft module comprises outer walls, elevator guide rails, an elevator door opening and an elevator door.

28. The method of claim 27, wherein the outer walls of the shaft module define an elevator shaft, along which an elevator cab is movable.

29. The method of claim 27, wherein at least one of the one or more shaft modules comprises an elevator controller.

30. The method of claim 18, wherein the cap module comprises a hoist beam, a power connection, and elements that support elevator cab movements.

31. The method of claim 30, wherein the elements that support elevator cab movements comprise a traction motor for a traction-type elevator system.

32. The method of claim 18, wherein each of the one or more shaft modules comprises counterweight rails for guiding a counterweight through each shaft module for a traction-type elevator system.

33. The method of claim 32, wherein each of the one or more shaft modules includes outer walls and at least one of the one or more shaft modules comprises a counterweight frame for rigidly attaching the counterweight rails to the outer walls for guiding the counterweight through the each of the one or more shaft modules.

34. The method of claim 18, wherein the pit module, the one or more shaft modules, and the cap module each comprise outer walls that intersect with each other at an intersection.

35. The method of claim 34, wherein the self-aligning connectors and the retention features are positioned at the intersection of the outer walls.

* * * * *